United States Patent
Tong et al.

(10) Patent No.: US 7,792,188 B2
(45) Date of Patent: Sep. 7, 2010

(54) SELECTING ENCODING TYPES AND PREDICTIVE MODES FOR ENCODING VIDEO DATA

(75) Inventors: Xin Tong, Mountain View, CA (US); Xiaochun Nie, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 786 days.

(21) Appl. No.: 11/070,778

(22) Filed: Mar. 1, 2005

(65) Prior Publication Data
US 2005/0286630 A1 Dec. 29, 2005

Related U.S. Application Data

(60) Provisional application No. 60/583,447, filed on Jun. 27, 2004.

(51) Int. Cl.
*H04B 1/66* (2006.01)

(52) U.S. Cl. ............. 375/240; 375/240.11; 375/240.12; 375/240.13; 375/240.16; 375/240.17; 375/240.23; 375/240.24

(58) Field of Classification Search ............ 375/240.11, 375/240.12, 240.13, 240.16, 240.17, 240.24, 375/240.23
See application file for complete search history.

(56) References Cited

U.S. PATENT DOCUMENTS

| 5,060,285 A | 10/1991 | Dixit et al. |
|---|---|---|
| 5,200,820 A | 4/1993 | Gharavi |
| 5,488,419 A | 1/1996 | Hui et al. |
| 5,576,767 A * | 11/1996 | Lee et al. ............... 375/240.14 |
| 5,706,059 A | 1/1998 | Ran et al. |
| 5,731,850 A | 3/1998 | Maturi et al. |
| 5,757,668 A | 5/1998 | Zhu |

(Continued)

FOREIGN PATENT DOCUMENTS

GB  2348559  10/2000

(Continued)

OTHER PUBLICATIONS

Non-Final Office Action of U.S. Appl. No. 11/751,552, Nov. 30, 2007 (mailing date), Kumar, Roger, et al., now issued as U.S. Patent 7,412,080.

(Continued)

*Primary Examiner*—Shuwang Liu
*Assistant Examiner*—Kabir A Timory
(74) *Attorney, Agent, or Firm*—Adeli & Tollen LLP

(57) ABSTRACT

In some embodiments, a method of determining encoding type and predictive mode(s) selections for a macroblock of a video frame is provided. In some embodiments, a general method 1) selects the encoding type (16×16 or 4×4) that is initially considered for a macroblock using an encoding type selection algorithm (based on an attribute of the macroblock that is easy to compute), 2) if the 16×16 encoding type is selected in step 1, consider the four 16×16 prediction modes that may be used on the macroblock using conventional methods or an improved 16×16 predictive mode search algorithm based on distortion thresholds, and 3) if the 4×4 encoding type is selected in step 1, select the 4×4 prediction mode to be used for each of the sixteen 4×4 blocks of the macroblock using conventional methods or an improved 4×4 predictive mode search algorithm based on the positional relationships between predictive modes.

20 Claims, 7 Drawing Sheets

U.S. PATENT DOCUMENTS

| | | | |
|---|---|---|---|
| 5,872,604 | A | 2/1999 | Ogura |
| 5,929,940 | A | 7/1999 | Jeannin |
| 6,081,209 | A | 6/2000 | Schuyler et al. |
| 6,128,047 | A | 10/2000 | Chang et al. |
| 6,192,081 | B1 | 2/2001 | Chiang et al. |
| 6,212,237 | B1 | 4/2001 | Minami et al. |
| 6,363,117 | B1 | 3/2002 | Kok |
| 6,380,986 | B1 | 4/2002 | Minami et al. |
| 6,483,876 | B1 | 11/2002 | Chang et al. |
| 6,498,815 | B2 | 12/2002 | Kleihorst et al. |
| 6,529,634 | B1 * | 3/2003 | Thyagarajan et al. ....... 382/239 |
| 6,567,469 | B1 | 5/2003 | Rackett |
| 6,646,578 | B1 * | 11/2003 | Au .............................. 341/67 |
| 6,668,020 | B2 | 12/2003 | Ma et al. |
| 6,842,483 | B1 | 1/2005 | Au et al. |
| 6,876,703 | B2 | 4/2005 | Ismaeil et al. |
| 6,895,361 | B2 | 5/2005 | Yang |
| 6,947,603 | B2 | 9/2005 | Kim |
| 7,239,721 | B1 | 7/2007 | Kumar et al. |
| 7,412,080 | B2 | 8/2008 | Kumar et al. |
| 2001/0008545 | A1 | 7/2001 | Takeda et al. |
| 2001/0019586 | A1 | 9/2001 | Kang et al. |
| 2002/0025001 | A1 | 2/2002 | Ismaeil et al. |
| 2002/0131500 | A1 | 9/2002 | Ghandi et al. |
| 2005/0117647 | A1 * | 6/2005 | Han ...................... 375/240.16 |
| 2005/0135484 | A1 | 6/2005 | Lee et al. |
| 2005/0249277 | A1 * | 11/2005 | Ratakonda et al. ..... 375/240.03 |
| 2005/0286635 | A1 | 12/2005 | Kumar et al. |
| 2005/0286777 | A1 | 12/2005 | Kumar et al. |

FOREIGN PATENT DOCUMENTS

| | | |
|---|---|---|
| WO | 2003/005700 | 1/2003 |
| WO | WO 2006/004667 | 1/2006 |

OTHER PUBLICATIONS

Notice of Allowance of U.S. Appl. No. 11/751,552, May 20, 2008 (mailing date), Kumar, Roger, et al., now issued as U.S. Patent 7,412,080.

Non-Final Office Action of U.S. Appl. No. 10/427,891, Sep. 25, 2006 (mailing date), Kumar, Roger, et al., now issued as U.S. Patent 7,239,721.

Notice of Allowance of U.S. Appl. No. 10/427,891, Feb. 8, 2007 (mailing date), Kumar, Roger, et al., now issued as U.S. Patent 7,239,721.

U.S. Appl. No. 10/427,890, filed Apr. 30, 2003, Kumar, Roger, et al.

Non-Final Office Action for U.S. Appl. No. 10/427,890, Apr. 12, 2006 (mailing date), Kumar, Roger, et al.

Final Office Action for U.S. Appl. No. 10/427,890, Oct. 27, 2006 (mailing date), Kumar, Roger, et al.

Advisory Action for U.S. Appl. No. 10/427,890, Jan. 25, 2007 (mailing date), Kumar, Roger, et al.

Non-Final Office Action for U.S. Appl. No. 10/427,890, May 29, 2007 (mailing date), Kumar, Roger, et al.

Final Office Action of U.S. Appl. No. 10/427,890, Dec. 18, 2007 (mailing date), Kumar, Roger, et al.

Non-Final Office Action of U.S. Appl. No. 10/427,890, Jan. 21, 2009 (mailing date), Kumar, Roger, et al.

Final Office Action of U.S. Appl. No. 10/427,890, Aug. 24, 2009 (mailing date), Kumar, Roger, et al.

Restriction Requirement of U.S. Appl. No. 11/119,428, May 29, 2009 (mailing date), Kumar, Roger, et al.

Restriction Requirement of U.S. Appl. No. 11/119,414, Jun. 4, 2009 (mailing date), Kumar, Roger, et al.

Written Opinion for PCT/US2005/022743, May 21, 2007 (mailing date), Apple Computers Inc., et al.

International Search Report for PCT/US2005/022743, May 21, 2007 (mailing date), Apple Computers Inc., et al.

International Preliminary Report on Patentability for PCT/US2005/022743, Jun. 19, 2007 (issuance date), Apple Computers Inc.

Turaga, et al. "Search algorithms for block-matching in motion estimation", pp. 1-14, Apr. 1998.

Non-Final Office Action of U.S. Appl. No. 11/119,428, Oct. 20, 2009 (mailing date), Kumar, Roger, et al., submitted on Oct. 19, 2009.

Non-Final Office Action of U.S. Appl. No. 11/119,414, Nov. 2, 2009 (mailing date), Kumar, Roger, et al., submitted on Oct. 19, 2009.

European Search Report of EP05291379.5, filed May 31, 2010, Apple Computer, Inc.

European Search Report EP05291381.1. filed Jun. 16, 2010, Apple Computer, Inc.

Clarke, R.J., et al., "Digital Compression of Still Images and Video, Other Intraframe Techniques. 2: Quadtree, Multiresolution and Neural Approaches," Jan. 1, 1995, pp. 195-205, Academic Press, London, UK.

Keissarian, F., "New Quadtree Predictive Image Coding Technique Using Pattern-Based Classification," Visual Communications and Image Processing, Jul. 8, 2003, pp. 1481-1490, vol. 5150.

Strobach, P., "Tree-Structured Scene Adaptive Coder," IEEE Transactions on Communications, Apr. 1, 1990, vol. 38, No. 4, IEEE Service Center, Piscataway, New Jersey.

Sullivan, G. J., et al. "Efficient Quadtree Coding of Images and Video," International Conference on Acoustics, Speech & Signal Processing, Toronto, Apr. 14, 1991, vol. Conf. 16, IEEE, New York.

"Test Model 5 Edition—International Organization for Standardization = Organisation Internationale de Normalisation," Jan. 1, 1993, pp. 1-119, version 2,.

Wang, Y., et al., "A Motion Vector Search Algorithm Based on a Simple Search-Block Interpolation Scheme," IEICE Transactions on Communications, Feb. 1, 2004, pp. 384389, vol. E87B, No. 2, Communications Society, Tokyo, Japan.

Wiegand, T., et al., "Entropy-Constrained Design of Quadtree Video Coding Schemes," Sixth International Conference on Image Processing and Its Applications, Jul. 14, 1997, pp. 3640, vol. 1, IEE, Dublin, UK.

* cited by examiner

SELECTING ENCODING TYPES AND PREDICTIVE MODES FOR ENCODING VIDEO DATA

CLAIM OF BENEFIT TO PRIOR APPLICATIONS

This patent application claims the benefit of United States Provisional Patent Application entitled "Encoding and Decoding Video," having Ser. No. 60/583,447 filed on Jun. 27, 2004.

FIELD OF THE INVENTION

The present invention is directed towards selecting encoding types and predictive modes for encoding video data.

BACKGROUND OF THE INVENTION

A video stream is comprised of a sequence of video frames where each frame is comprised of multiple macroblocks. Each macroblock is typically a 16×16 array of pixels, although other sizes of macroblocks are also possible. Video codecs (COmpressor-DECompressor) are software, hardware, or combined software and hardware implementations of compression algorithms designed to encode/compress and decode/decompress video data streams to reduce the size of the streams for faster transmission and smaller storage space. While lossy, video codecs attempt to maintain video quality while compressing the binary data of a video stream. Examples of popular video codecs include WMV, RealVideo, as well as implementations of compression standards such as MPEG-2, MPEG-4, H.261, H.263, and H.264.

Under H.264 compression standards, a macroblock of a video frame can be intra encoded as a 16×16 pixel array, the pixel values of the array being predicted using values calculated from previously encoded macroblocks. A 16×16 macroblock can also be intra encoded as sixteen 4×4 pixel arrays, where pixel values in each 4×4 array are predicted using values calculated from previously encoded 4×4 arrays. There are 4 possible intra prediction modes for 16×16 arrays (luma blocks) and 9 possible intra prediction modes for 4×4 arrays (luma blocks).

As such, in encoding a macroblock, two determinations (selections) must be made: 1) whether the macroblock is to be encoded as a 16×16 array (referred to herein as 16×16 encoding) or as sixteen 4×4 arrays (referred to herein as 4×4 encoding), and 2) the predictive mode(s) to be used to encode the macroblock. For example, if it is determined that the macroblock is to be encoded as a 16×16 array, it must also be determined which of the four predictive modes for the 16×16 array is to be used. If it is determined that the macroblock is to be encoded as a sixteen 4×4 arrays, it must also be determined, for each of the sixteen 4×4 arrays, which of the nine predictive modes for the 4×4 array is to be used. Step 1 is referred to herein as encoding type selection and step 2 is referred to herein as predictive mode selection.

Encoding type selection and predictive mode selection are made using cost functions. For example, cost functions are typically used to determine whether a macroblock is to be encoded as a 16×16 array or as sixteen 4×4 arrays where the type of encoding (16×16 or 4×4 encoding) having the lower cost is chosen. Cost is typically equal to the distortion or the weighted average of distortion plus an estimate of the number of bits produced by the prediction mode, where an increase in distortion and/or number of bits increases the cost. Distortion reflects the difference between original pixel values and predicted (or encoded) values and can be measured in various ways. For example, distortion can be measured as the sum of the absolute differences between the original pixel values and predicted (or encoded) values.

An exhaustive search approach to selecting an optimal encoding type (16×16 or 4×4 encoding) and optimal predictive mode(s) for a macroblock involves determining costs of all four 16×16 prediction modes and all combinations of nine 4×4 prediction modes for sixteen 4×4 blocks in the macroblock, where a 16×16 prediction mode or a particular combination of 4×4 prediction modes that gives the lowest cost is selected. For each macroblock, the exhaustive search approach requires consideration of 9^16 different combinations of 4×4 prediction modes, rendering the exhaustive search approach practically infeasible.

As such, the following operations are typically performed to determine the encoding type and predictive mode(s) for a macroblock:

1) Compute the cost of all four possible 16×16 predictive modes.
2) For each of the sixteen 4×4 blocks, select the predictive mode (among the 9 predictive modes) having the lowest cost, and then compute the total cost of the resulting combination (i.e., the sum cost of the sixteen determined costs).
3) Compare the cost determined at step 1 with the cost determined at step 2 and select the lowest one. This selection provides both the encoding type selection and the predictive mode(s) selection.

The conventional approach, however, still involves determining costs for 9×16 different combinations of the 4×4 predictive modes plus the costs for the four 16×16 predictive modes.

SUMMARY OF THE INVENTION

In some embodiments, a more efficient method of determining an encoding type selection and predictive mode(s) selection for a macroblock in a video frame is provided. In some embodiments, a general method 1) selects the encoding type (16×16 or 4×4) that is initially considered for a macroblock using an encoding type selection algorithm (based on an attribute of the macroblock that is easy to compute), 2) if the 16×16 encoding type is selected in step 1, consider the four 16×16 prediction modes that may be used on the macroblock using conventional methods or an improved 16×16 predictive mode search algorithm based on distortion thresholds, and 3) if the 4×4 encoding type is selected in step 1, select the 4×4 prediction mode to be used for each of the sixteen 4×4 blocks of the macroblock using conventional methods or an improved 4×4 predictive mode search algorithm based on the positional relationships between predictive modes.

DETAILED DESCRIPTION

The disclosure of U.S. Provisional Patent Application "Encoding and Decoding Video," having Ser. No. 60/583,447 filed on Jun. 27, 2004, is hereby expressly incorporated herein by reference.

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

In some embodiments, a more efficient method of determining an encoding type selection and predictive mode(s) selection for a macroblock in a video frame is provided. In some embodiments, a general search algorithm performs the following operations:

1) Select the encoding type (16×16 or 4×4) that is initially considered for a macroblock using an encoding type selection algorithm (based on an attribute of the macroblock that is easy to compute). The encoding type selection algorithm is discussed below in Section I.

2) If the 16×16 encoding type is selected in step 1, consider (i.e., test) the four 16×16 prediction modes that may be used on the macroblock using conventional methods or an improved 16×16 predictive mode search algorithm based on distortion thresholds. Note that in one particular situation of the 16×16 predictive mode search algorithm, the 4×4 encoding type may also be selected. This step is discussed below in Section II.

3) If the 4×4 encoding type is selected in step 1, select the 4×4 prediction mode to be used for each of the sixteen 4×4 blocks of the macroblock using conventional methods or an improved 4×4 predictive mode search algorithm based on the positional relationships between predictive modes (as discussed below in Section III).

Note that in step 1 of the search algorithm, if the encoding type selection algorithm selects the 16×16 encoding type for initial consideration, the encoding type that is ultimately selected may be the 16×16 encoding type or the 4×4 encoding type. In contrast, if the encoding type selection algorithm selects the 4×4 encoding type for initial consideration, the 4×4 encoding type is, in effect, selected as the encoding type for the macroblock. If the 16×16 encoding type is selected for initial consideration, conventional methods or the improved 16×16 predictive mode search algorithm is then used to determine predictive mode(s) for the macroblock. If the 4×4 encoding type is selected for initial consideration, conventional methods or the improved 4×4 predictive mode search algorithm is then used to determine the predictive mode(s) for the macroblock. As such, depending on which encoding type is selected for initial consideration by the search algorithm, different search algorithms (whether conventional or improved) are then used to determine the predictive mode.

Figure 1:
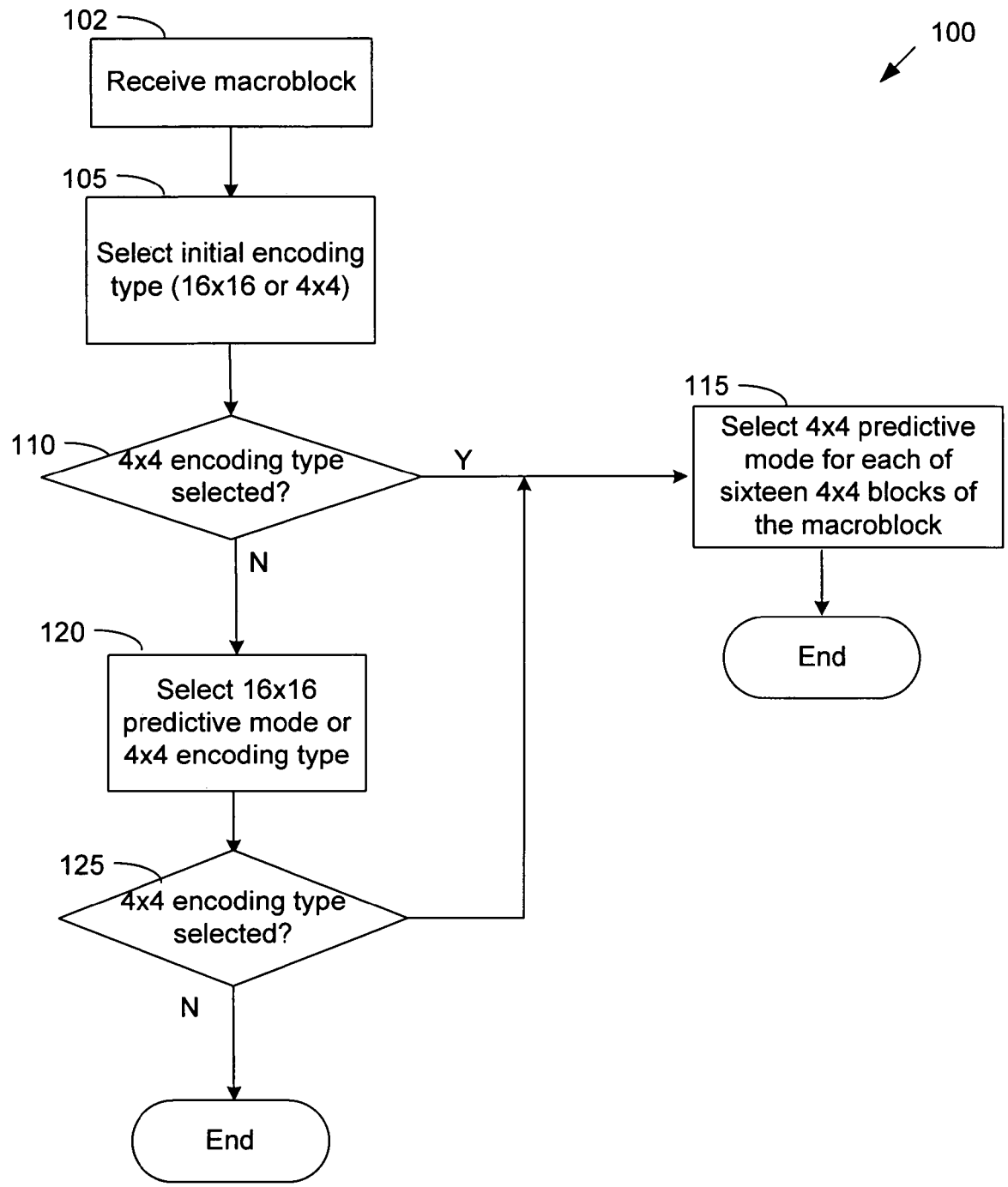
FIG. 1 is a flowchart of a general method for selecting an encoding type and predictive mode(s) for a macroblock of pixels.

FIG. 1 is a flowchart of a general method 100 for selecting an encoding type and predictive mode(s) for a macroblock of pixels. In some embodiments, the general method 100 is implemented by software and/or hardware configured to encode video frames. The method begins when it receives (at 102) a macroblock of pixels. In some embodiments, the macroblock is a 16×16 array of pixels, while in other embodiments, the macroblock is an array of pixels of a different size. In some embodiments, the macroblock is partitioned into four 8×8 arrays or sixteen 4×4 arrays, while in other embodiments, the macroblock is partitioned into blocks/arrays of different sizes.

The method then selects (at 105) an encoding type (16×16 or 4×4) that is initially considered for the macroblock using an encoding type selection method 200 (discussed below in relation to FIG. 2). The method then determines (at 110) whether the 4×4 encoding type has been selected. If so, the method then selects (at 115) the prediction mode for each of the sixteen 4×4 blocks of the macroblock using conventional methods, an improved 4×4 predictive mode search method 500 (discussed below in relation to FIG. 5), or an alternative 4×4 predictive mode search method 600 (discussed below in relation to FIG. 6).

If the method determines (at 110—No) that the 4×4 encoding type has not been selected, the method then selects (at 120) a 16×16 prediction mode (using conventional methods or an improved 16×16 predictive mode search method 300, as discussed below in relation to FIG. 3) or the 4×4 encoding type. The method then determines (at 125) whether the 4×4 encoding type has been selected (at 120). If so, the method continues at step 115 where the prediction mode for each of the sixteen 4×4 blocks of the macroblock is selected. If the method determines (at 125—No) that the 4×4 encoding type has not been selected, this indicates that a particular 16×16 predictive mode has been selected. The method then ends.

Section I: Encoding Type Selection Algorithm

This Section describes the encoding type selection algorithm of step 1 of the general search algorithm. The encoding type selection algorithm selects the encoding type (16×16 or 4×4) that is initially considered for a macroblock and thus decides which predictive modes (16×16 modes or 4×4 modes) are initially considered for the macroblock. The encoding type selection algorithm uses an attribute of the macroblock that is easy to determine.

The encoding type selection algorithm performs the following operations:

1) The macroblock is divided into four 8×8 blocks.

2) The variance of each 8×8 block is calculated and compared against a predetermined threshold. For example, the predetermined threshold may be set to equal the average variance of all 8×8 blocks in the frame in which the macroblock is included. Variance of an 8×8 block may be determined, for example, by a) determining the mean of all pixel values in the block, b) determining for each pixel in the block: (pixel value−mean)^2, and c) summing all values determined at step b (i.e., summing all the determined values for all pixels in the block).

3) Determine the number of 8×8 blocks in the macroblock having variances below the predetermined threshold (which is the attribute used to determine whether the macroblock is to be encoded as a 16×16 block or sixteen 4×4 blocks).

4) If all four 8×8 blocks have variances below the predetermined threshold, the 16×16 encoding type is selected for initial consideration. Note that if the 16×16 encoding type is selected for initial consideration, the encoding type that is ultimately selected may be the 16×16 encoding type or the 4×4 encoding type. A 16×16 prediction mode to be used on the macroblock may be selected using conventional methods or an improved 16×16 predictive mode search algorithm (as discussed below in Section II).

5) If any of the four 8×8 blocks has a variance that exceeds the predetermined threshold, the 4×4 encoding type is selected. As such, the 4×4 prediction mode to be used on each of the sixteen 4×4 blocks of the macroblock is then determined using conventional methods or an improved 4×4 predictive mode search algorithm (as discussed below in Section III).

Note that when the quantization parameter value used in the quantization step of the encoding process is relatively high (e.g., above 34), the operations of the encoding type selection algorithm deviate slightly from the above description. In these embodiments, the predetermined threshold is scaled by a factor dependent on the quantization parameter value (QP) so that as the quantization parameter value increases, the predetermined threshold is increased. In some embodiments, the scaling factor is determined by a scaling equation in the form: (1+k(QP−34)) where k is a constant. In other embodiments, the scaling factor is determined by another scaling equation. The predetermined threshold is then multiplied by the determined scaling factor to produce a scaled threshold.

In these embodiments, if any of the four 8×8 blocks have a variance exceeding the scaled threshold, the macroblock is encoded as sixteen 4×4 blocks. This selection can be made using conventional methods or methods of the present invention (such as the improved 4×4 predictive mode search algorithm). However, if it is determined that all four 8×8 blocks of the macroblock have variances below the scaled threshold, the macroblock can be encoded as a 16×16 block or as sixteen 4×4 blocks. The 16×16 prediction mode to be used on the macroblock can then be selected using conventional methods or an improved 16×16 predictive mode search algorithm (as discussed below in Section II). If the 4×4 encoding type is chosen over the selected 16×16 prediction mode, the 4×4 predictive modes can be selected using conventional methods or methods of the present invention (such as the improved 4×4 predictive mode search algorithm).

Figure 2:
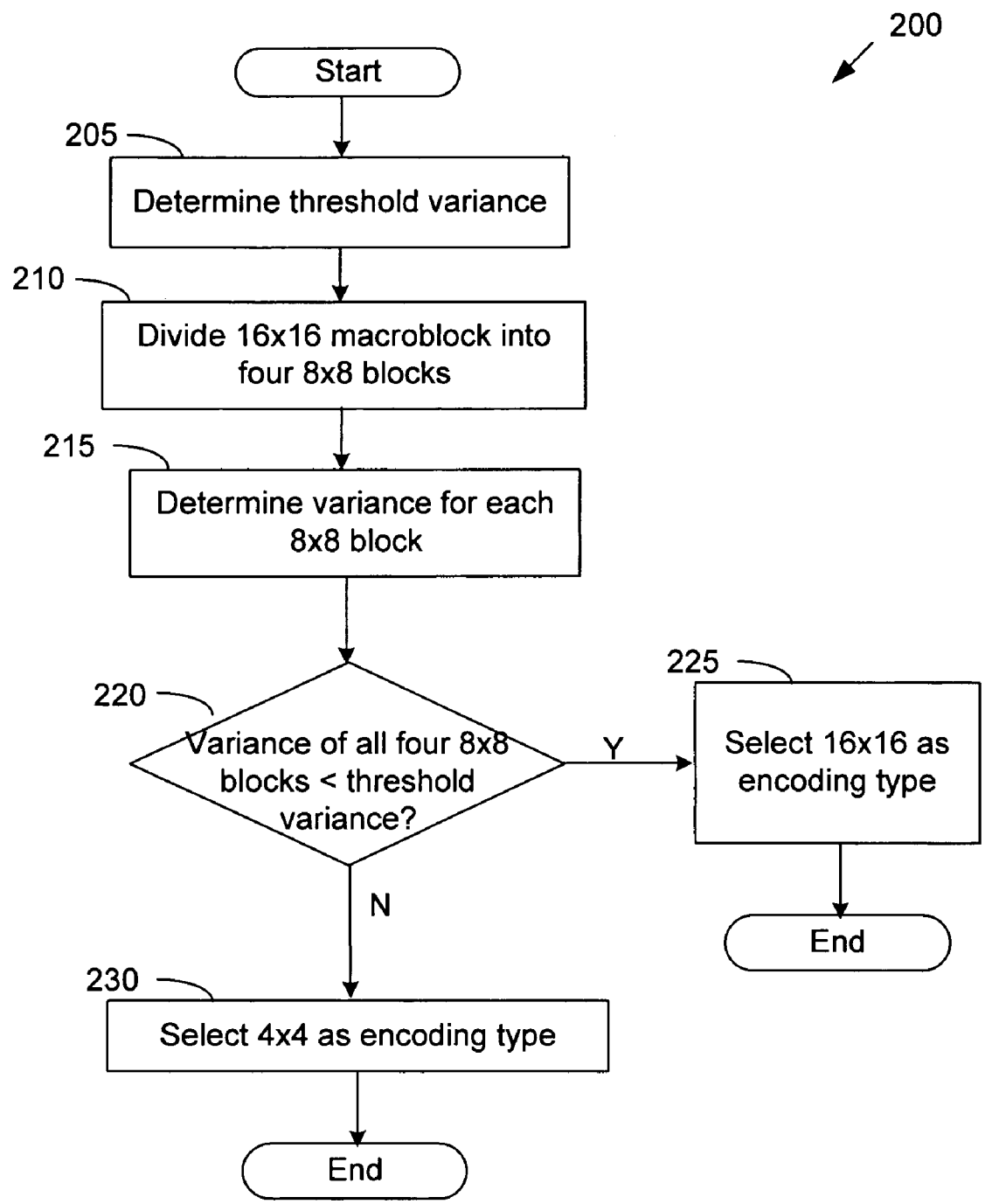
FIG. 2 is a flowchart of an encoding type selection method for selecting an encoding type for a macroblock of pixels.

FIG. 2 is a flowchart of an encoding type selection method 200 for selecting an encoding type for a macroblock of pixels. In some embodiments, the method 200 is implemented by software and/or hardware configured to encode video frames. In some embodiments, the encoding type selection method 200 comprises step 105 of FIG. 1. The method 200 begins by determining (at 205) a threshold variance for the macroblock. In some embodiments, the threshold variance is set to equal the average variance of all 8×8 blocks in the frame in which the macroblock is included (as discussed above). In other embodiments, when the quantization parameter value used in the quantization step of the encoding process is relatively high, the determined threshold variance is scaled by a factor dependent on the quantization parameter value (as discussed above).

The method then divides (at 210) the macroblock into four 8×8 blocks and determines (at 215) a variance for each of the four 8×8 blocks. The method then determines (at 220) whether the variance of all four 8×8 blocks is below the threshold variance. If so, the method selects (at 225) the 16×16 encoding type for the macroblock and ends. If not, the method selects (at 230) the 4×4 encoding type for the macroblock and ends.

Section II: 16×16 Predictive Mode Search Algorithm

After step 1 of the general search algorithm, if the 16×16 encoding type has been selected for initial consideration, the 16×16 predictive modes are then tested. This Section describes step 2 of the general search algorithm. Under the H.264 codec standards, there are four possible 16×16 intra prediction modes to select from: DC, V (vertical), H (horizontal), and P (planar). In some embodiments, conventional methods are used to select the 16×16 predictive mode (for example, by determining the costs of each of the four 16×16 predictive modes and selecting the mode with the lowest cost). In other embodiments, an improved 16×16 predictive mode search algorithm is used to consider (i.e., test) the 16×16 predictive modes for the macroblock based on the distortion caused by a predictive mode.

In some embodiments, the 16×16 predictive mode search algorithm uses conventional methods to determine the distortion caused by a particular predictive mode as applied to a currently processed macroblock. Under conventional methods, this distortion is determined by 1) retrieving pixel values from a neighboring previously-encoded macroblock, 2) deriving new values from the retrieved pixel values, 3) calculating predictive values for the currently processed macroblock using the derived values, and 4) determining the distortion between the original pixel values of the currently processed macroblock and the calculated predictive values. Determination of distortion using conventional methods, however, is time consuming.

In other embodiments, the 16×16 predictive mode search algorithm uses a faster estimation method to determine the distortion caused by a particular predictive mode as applied to a currently processed macroblock. The estimation method provides an estimate (emulation) of the predictive values that would be produced by a particular predictive mode and then determines the distortion of the estimated predictive values.

Under the estimation method, the predictive values are determined by using pixel values from the currently processed macroblock itself, assuming that the pixel values of the currently processed macroblock at the borders are similar to adjacent pixel values from neighboring macroblocks. Determination of distortion using the estimation method is less time consuming since pixel values from the currently processed macroblock are used rather than pixel values from other macroblocks, which reduces retrieval time. Use of the estimation method significantly reduces the time needed to determine distortion values with a low loss of precision.

In some embodiments, the pseudo code for the estimation method is as follows: choose 16×16 mode( )

```
{
step 1:
    // DC prediction
    pred = average of pixels in the left column and top row of
    the current macroblock
    foreach 4×4 block
    {
        SAD_DC = sad(4×4 block, pred);
        if (SAD_DC>T)
        {
            bail and goto step2;
        }
    }
    choose 16×16 DC mode and return
step2:
    // vertical prediction
    foreach 4×4 block
    {
        SAD_V = 0;
        foreach column in the 4×4 block
        {
            pred = pixel value in the top row of this column
            in the current
        macroblock
            SAD_V += sad(4×4 block column, pred);
        }
```

-continued

```
        SAD_V >>= 4;
        if (SAD_V>T)
        {
            bail and goto step3;
        }
    }
    choose 16×16 V and return
step3:
    // horizontal prediction
    foreach 4×4 block
    {
        SAD_H = 0;
        foreach row in the 4×4 block
        {
            pred = pixel value in the left column of this row
                in the current
        macroblock
            SAD_H += sad(4×4 block row, pred);
        }
        SAD_H >>= 4;
        if (SAD_H>T)
        {
            choose 16×16 planar and 4×4 modes and return
        }
    }
    choose 16×16 H and return
}
```

Regardless of the way the distortion of a particular predictive mode is calculated, the 16×16 predictive mode search algorithm performs the following operations:

1) Test the 16×16 DC prediction mode:
   a) Determine the distortion caused in each 4×4 block of the macroblock by the 16×16 DC prediction mode.
   b) If the distortion in each 4×4 block is below a predetermined threshold, the 16×16 DC prediction mode is selected as the prediction mode for this macroblock and the 16×16 predictive mode search algorithm ends.
   c) If the distortion in any 4×4 block exceeds the predetermined threshold, the 16×16 predictive mode search algorithm proceeds to step 2.
2) Test the 16×16 V prediction mode:
   a) Determine the distortion caused in each 4×4 block of the macroblock by the 16×16 V prediction mode.
   b) If the distortion in each 4×4 block is below a predetermined threshold, the 16×16 V prediction mode is selected as the prediction mode for this macroblock and the 16×16 predictive mode search algorithm ends.
   c) If the distortion in any 4×4 block exceeds the predetermined threshold, the 16×16 predictive mode search algorithm proceeds to step 3.
3) Test the 16×16H prediction mode:
   a) Determine the distortion caused in each 4×4 block of the macroblock by the 16×16H prediction mode.
   b) If the distortion in each 4×4 block is below a predetermined threshold, the 16×16H prediction mode is selected as the prediction mode for this macroblock and the 16×16 predictive mode search algorithm ends.
   c) If the distortion in any 4×4 block exceeds the predetermined threshold, the 16×16 predictive mode search algorithm considers 16×16 P prediction mode and the 4×4 encoding type. In some embodiments, a selection between the two mentioned options is facilitated by use of the 4×4 predictive mode search algorithm (discussed below in Section III). In other embodiments, a selection between the two mentioned options is made using conventional methods (for example, by determining the cost of the 16×16 P prediction mode and the lowest cost incurred by using the 4×4 encoding type and selecting the option with the lowest cost).

Figure 3:
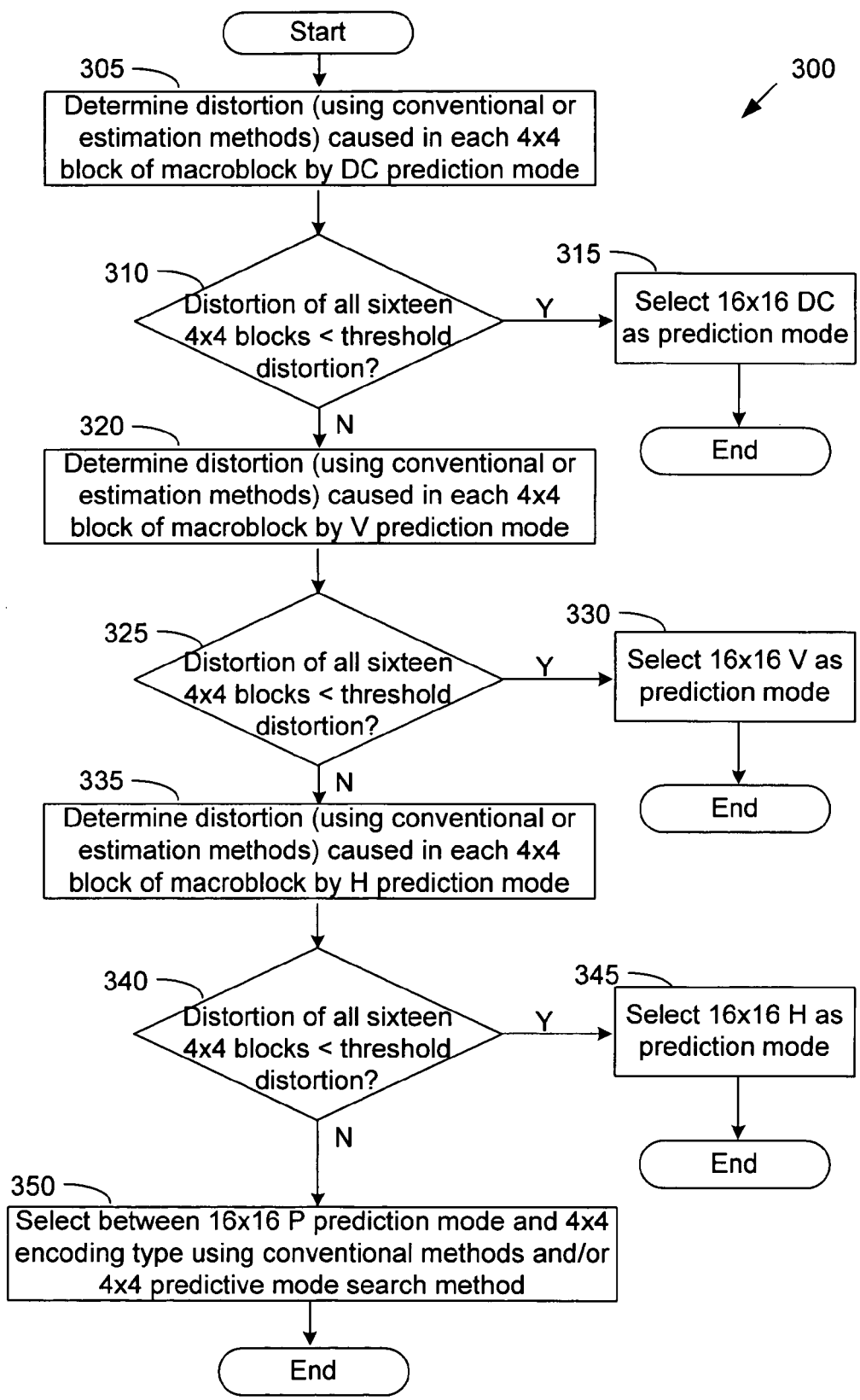
FIG. 3 is a flowchart of a 16×16 predictive mode search method for selecting a predictive mode of a 16×16 macroblock of pixels.

FIG. 3 is a flowchart of a 16×16 predictive mode search method 300 for selecting a predictive mode of a 16×16 macroblock of pixels. In some embodiments, the method 300 is implemented by software and/or hardware configured to encode video frames. In some embodiments, the encoding type selection method 300 comprises step 120 of FIG. 1. In some embodiments, the 16×16 predictive mode search method uses conventional methods or an improved estimation method to determine the distortion of 4×4 blocks in the macroblock caused by a particular predictive mode (as discussed above).

The method 300 begins by determining (at 305) the distortion caused in each of the sixteen 4×4 blocks of the macroblock by the 16×16 DC prediction mode. The method then determines (at 310) if the distortion in all 4×4 blocks caused by the 16×16 DC prediction mode is below a predetermined threshold distortion. If so, the 16×16 DC prediction mode is selected (at 315) as the prediction mode for the macroblock and the method ends.

If the method 300 determines (at 310—No) that the distortion in any of the 4×4 blocks caused by the 16×16 DC prediction mode is not below the predetermined threshold distortion, the method determines (at 320) the distortion caused in each of the sixteen 4×4 blocks of the macroblock by the 16×16 V prediction mode. The method then determines (at 325) if the distortion in all 4×4 blocks caused by the 16×16 V prediction mode is below the predetermined threshold distortion. If so, the 16×16 V prediction mode is selected (at 330) as the prediction mode for the macroblock and the method ends.

If the method 300 determines (at 325—No) that the distortion in any of the 4×4 blocks caused by the 16×16 V prediction mode is not below the predetermined threshold distortion, the method determines (at 335) the distortion caused in each of the sixteen 4×4 blocks of the macroblock by the 16×16H prediction mode. The method then determines (at 340) if the distortion in all 4×4 blocks caused by the 16×16H prediction mode is below the predetermined threshold distortion. If so, the 16×16H prediction mode is selected (at 345) as the prediction mode for the macroblock and the method ends.

If the method 300 determines (at 340—No) that the distortion in any of the 4×4 blocks caused by the 16×16H prediction mode is not below the predetermined threshold distortion, the method selects (at 350) between setting the 16×16 P prediction mode as the prediction mode for the macroblock or setting the 4×4 encoding type for the macroblock. In some embodiments, a selection between the two aforementioned options is facilitated by use of the 4×4 predictive mode search method 500 (discussed below in relation to FIG. 5). In other embodiments, a selection between the two mentioned options is made using conventional methods (as discussed above). The method then ends.

Section III: 4×4 Predictive Mode Search Algorithm

After step 1 of the general search algorithm, if the 4×4 encoding type has been selected for initial consideration, a 4×4 predictive mode is then selected for each of the sixteen 4×4 blocks of the macroblock. This Section describes step 3 of the general search algorithm. In some embodiments, conventional methods are used to select a 4×4 predictive modes for each 4×4 block (for example, by determining the costs of each of the nine predictive modes and selecting the mode with the lowest cost). In other embodiments, an improved 4×4 predictive mode search algorithm is used to select the 4×4 predictive mode for the 4×4 block.

As discussed above, a video stream is comprised of a sequence of video frames where each frame is comprised of multiple macroblocks. A macroblock is typically a 16×16 array of pixels (although other sizes of macroblocks are also possible) and is divided into partitions (such as partitions of 4×4 pixel arrays). Under the H.264 codec standards, when intra encoding a frame, there are 9 different ways to encode a 4×4 array (i.e., there are 9 intra 4×4 prediction modes). The 9 modes are:

0. Intra_4×4_Vertical
1. Intra_4×4_Horizontal
2. Intra_4×4_DC
3. Intra_4×4_Diagonal_Down_Left
4. Intra_4×4_Diagonal_Down_Right
5. Intra_4×4_Vertical_Right
6. Intra_4×4_Horizontal_Down
7. Intra_4×4_Vertical_Left
8. Intra_4×4_Horizontal_Up Each 4×4 array is encoded in only one prediction mode. Typically, the prediction mode that results in a lowest cost will be picked. Cost is typically equal to the distortion (where distortion reflects the difference between original pixel values and encoded predictive values) or the weighted average of distortion and a bit number produced by the prediction mode (where an increase in distortion and/or bit number increases the cost). An exhaustive search among all 9 prediction modes can be performed to determine the optimal prediction mode (the select prediction mode) having the lowest cost. Typically, however, an exhaustive search among all 9 prediction modes is not efficient (consumes too much time and processing resources).

In some embodiments, a more efficient method of determining a prediction mode for a pixel array is used. In some embodiments, a searching algorithm is used that considers a reduced number of prediction modes in determining the prediction mode for a pixel array. The searching algorithm is more efficient and incurs a relatively low loss of precision.

Figure 4:
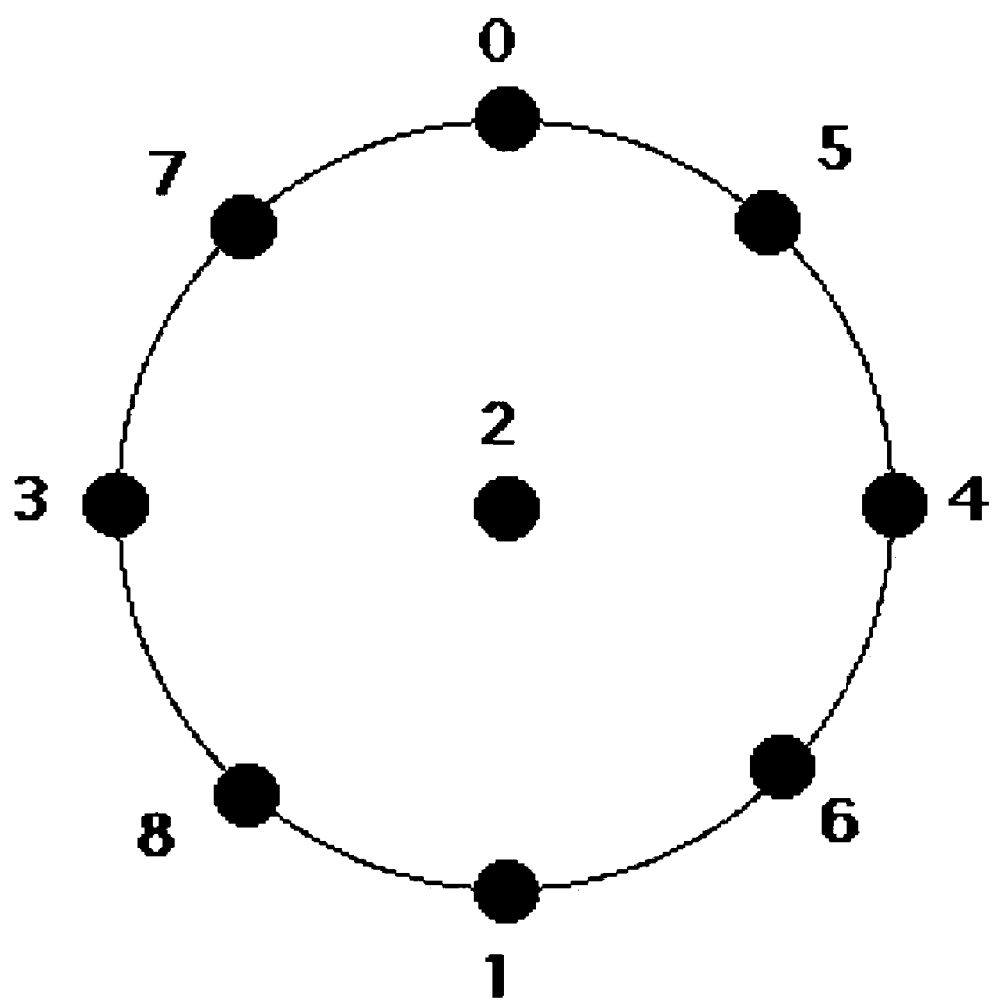
FIG. 4 shows a conceptual diagram illustrating the logical/positional relationships between the 9 predictive modes of a 4×4 array.

The searching algorithm is based on the logical/positional relationships between the 9 possible predictive modes of a 4×4 array. FIG. 4 shows a conceptual diagram illustrating the logical/positional relationships between the 9 predictive modes of a 4×4 array. As shown in FIG. 4, there are 8 predictive modes (0, 1, 3, 4, 5, 6, 7, and 8) placed around a circle with one predictive mode (2) placed in the center of the circle, the predictive modes being represented by nodes. The closer two predictive modes are to each other on the circle, the stronger the logical/positional relationship is between the two predictive modes. As such, the farther two predictive modes are to each other on the circle, the weaker the logical/positional relationship is between the two predictive modes. For example, since predictive modes 0 and 5 are adjacent to each other on the circle, this indicates that there is a strong logical/positional relationship between the two predictive modes. As a further example, since predictive modes 0 and 1 are on opposite points on the circle, this indicates that there is a weak logical/positional relationship between the two predictive modes. Predictive mode 2 is in the center of the circle to indicate that it has no logical/positional relationship with any of the other predictive modes.

The conceptual diagram of FIG. 4 is based on the H.264 codec standards for intra encoding 4×4 arrays. For a currently processed 4×4 array, predictive modes under the H.264 standard indicate the position (relative to the currently processed 4×4 array) of another 4×4 array (referred to herein as the predictive array) that is to be the basis of the predictive information encoded for the currently processed array. For example, predictive mode 0 (Vertical) indicates that the predictive array for a currently processed array is located above the currently processed array and predictive mode 1 (Horizontal) indicates that the predictive array for a currently processed array is located to the left of the currently processed array.

As such, the strength or weakness of logical/positional relationships between predictive modes can be accessed (based on positional relationships indicated by the predictive modes relative to the currently processed 4×4 array). For example, predictive mode 0 has a weak logical/positional relationship to predictive mode 1 since the predictive array being located above the currently processed array (indicated by predictive mode 0) has a weak logical/positional relationship to the predictive array being located to the left of the currently processed array (indicated by predictive mode 1). This weak logical/positional relationship is reflected in FIG. 4 where predictive modes 0 and 1 are on opposite parts of the circle. In contrast, predictive mode 0 has a strong logical/positional relationship to predictive mode 5 since the predictive array being located above the currently processed array (indicated by predictive mode 0) has a strong logical/positional relationship to the predictive array being located to above and to the right of the currently processed array (indicated by predictive mode 5). This strong logical/positional relationship is reflected in FIG. 4 where predictive modes 0 and 5 are adjacent on the circle.

The 8 predictive modes (0, 1, 3, 4, 5, 6, 7, and 8) placed around the circle can be divided into four groupings of logically/positionally related predictive modes:

1. 7, 0, and 5 (Vertical_Left, Vertical, and Vertical_Right)
2. 8, 1, and 6 (Horizontal_Up, Horizontal, and Horizontal_Down)
3. 7, 3, and 8 (Vertical_Left, Diagonal_Down_Left, and Horizontal_Up)
4. 5, 4, and 6 (Vertical_Right, Diagonal_Down_Right, and Horizontal_Down)

Predictive modes within the same grouping have a strong logical/positional relationship with each other. In some embodiments, the searching algorithm initially determines the cost of one predictive mode from each grouping along with the cost of predictive mode 2. The searching algorithm then determines the predictive mode among this set of predictive modes having the lowest cost. If the predictive mode having the lowest cost is in a particular grouping of predictive modes, there is a significant chance that the lowest cost of all 9 possible predictive modes is in that particular grouping. As such, the searching algorithm then determines the predictive mode having the lowest cost in that particular grouping, the predictive mode having the lowest cost being selected as the optimal predictive mode for an array.

For example, in some embodiments, the searching algorithm initially determines the cost of predictive modes 0, 1, 2, 3, and 4, where predictive modes 0, 1, 3, and 4 are each from different groupings. If predictive mode 0, 1, 3, or 4 has the lowest cost among the set of predictive modes (0, 1, 2, 3, and 4), the searching algorithm then determines the lowest cost among the grouping of predictive modes in which the prior determined predictive mode is included. For example, if the searching algorithm determines that predictive mode 1 has the lowest cost among the set of predictive modes (0, 1, 2, 3, and 4), the searching algorithm then determines the lowest cost among the grouping of predictive modes (8, 1, and 6), the predictive mode having the lowest cost being selected as the optimal predictive mode.

In some embodiments, the searching algorithm initially considers and compares costs of a predetermined set of prediction modes, the set comprising some but not all of the 9 possible prediction modes. In some embodiments, the predetermined set of prediction modes comprises one predictive mode from each of the four predictive mode groupings (discussed above in relation to FIG. 4). In the embodiments described below, the predetermined set of prediction modes comprises prediction modes 0, 1, 2, 3, and 4. In other embodiments, however, the predetermined set of prediction modes comprises other prediction modes.

The searching algorithm determines a cost for each prediction mode in the set where C0, C1, C2, C3 and C4 are the determined costs for prediction modes 0, 1, 2, 3, and 4, respectively. The cost for each prediction mode may be determined using methods known in the art. The searching algorithm then determines the index number (0, 1, 2, 3, or 4) of the prediction mode having the lowest cost where variable n is used to represent the determined index number. These operations can be expressed by the following equation:

$$n = GetIn1OfMinCost(0,1,2,3,4)$$

where GetIn1OfMinCost is a function that determines a cost for each prediction mode in a set of prediction modes (e.g., 0, 1, 2, 3, and 4) and determines the index number of a prediction mode in the set having has the lowest cost.

The searching algorithm then performs the following operations:
If n==2
  x=2
Else If n==0
  x==GetIn1OnfMinCost(7, 0, 5)
Else If n==1
  x=GetIn1OfMinCost(8, 1, 6)
Else If n==3
  x==GetIn1OfMinCost(7, 3, 8)
Else If n==4
  x==GetIn1OfMinCost(5, 4, 6)

where x is the index number of the prediction mode that is ultimately chosen as the optimal prediction mode (the select prediction mode) for the pixel array.

As such, the searching algorithm determines if n is equal to 2. If so, the selected prediction mode is prediction mode 2. If n is not equal to 2, the searching algorithm then determines if n is equal to 0. If so, the selected prediction mode is the prediction mode having the lowest cost of the set of prediction modes (7, 0, 5). If n is not equal to 0, the searching algorithm then determines if n is equal to 1. If so, the selected prediction mode is the prediction mode having the lowest cost of the set of prediction modes (8, 1, 6). If n is not equal to 1, the searching algorithm then determines if n is equal to 3. If so, the selected prediction mode is the prediction mode having the lowest cost of the set of prediction modes (7, 3, 8). If n is not equal to 3, the searching algorithm then determines if n is equal to 4. If so, the selected prediction mode is the prediction mode having the lowest cost of the set of prediction modes (5, 4, 6).

Figure 5:
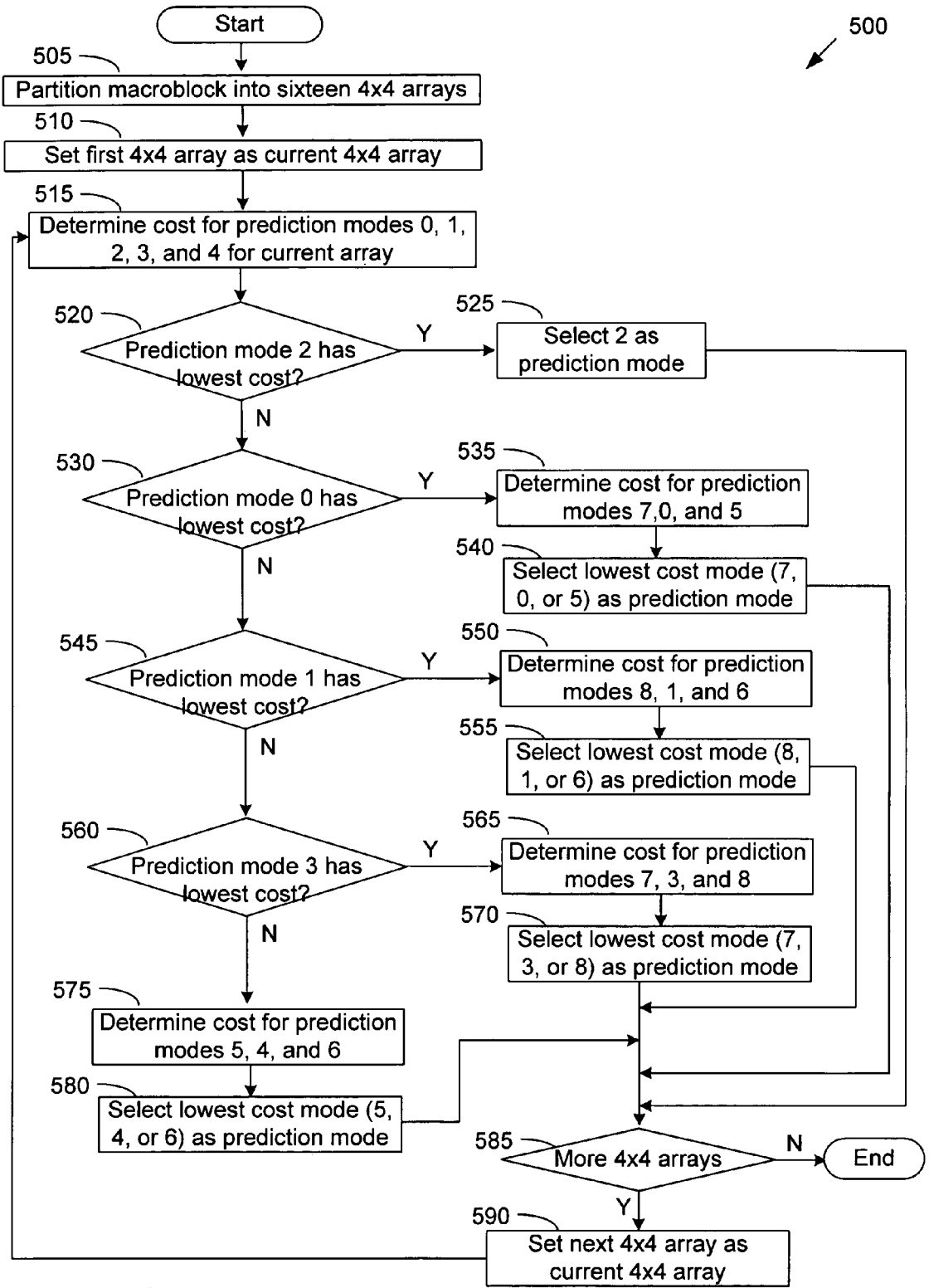
FIG. 5 is a flowchart of a 4×4 predictive mode searching method that selects predictive modes for 4×4 arrays of a macroblock.

FIG. 5 is a flowchart of a 4×4 predictive mode searching method 500 that selects predictive modes for 4×4 arrays of a macroblock. In some embodiments, the method 500 is implemented by software and/or hardware configured to encode video frames. In some embodiments, the 4×4 predictive mode searching method 500 comprises step 115 of FIG. 1.

The method 500 begins by partitioning (at 505) the macroblock into sixteen 4×4 arrays. The method then sets (at 510) a first 4×4 array as a current 4×4 array for processing. For the current 4×4 array, the method 500 then determines (at 515) a cost for each of the prediction modes 0, 1, 2, 3, and 4. The method determines (at 520) if the prediction mode with the lowest cost is 2. If so, the method sets (at 525) predictive mode 2 as the predictive mode for the current 4×4 array. The method then determines (at 585) if there are more 4×4 arrays in the macroblock to be processed. If so, the method sets (at 590) a next 4×4 array as the current 4×4 array and continues at step 515. If not, the method ends.

If the method determines (at 520—No) that the prediction mode with the lowest cost is not 2, the method then determines (at 530) if the prediction mode with the lowest cost is 0. If so, the method then determines (at 535) a cost for each of the prediction modes 7, 0, and 5. The method then sets (at 540) the predictive mode with the lowest cost (among the prediction modes 7, 0, and 5) as the predictive mode for the current 4×4 array. The method then continues at step 585.

If the method determines (at 530—No) that the prediction mode with the lowest cost is not 0, the method then determines (at 545) if the prediction mode with the lowest cost is 1. If so, the method then determines (at 550) a cost for each of the prediction modes 8, 1, and 6. The method then sets (at 555) the predictive mode with the lowest cost (among the prediction modes 8, 1, and 6) as the predictive mode for the current 4×4 array. The method then continues at step at 585.

If the method determines (at 545—No) that the prediction mode with the lowest cost is not 1, the method then determines (at 560) if the prediction mode with the lowest cost is 3. If so, the method then determines (at 565) a cost for each of the prediction modes 7, 3, and 8. The method then sets (at 570) the predictive mode with the lowest cost (among the prediction modes 7, 3, and 8) as the predictive mode for the current 4×4 array. The method then continues at step at 585.

If the method determines (at 560—No) that the prediction mode with the lowest cost is not 3, this indicates that the prediction mode with the lowest cost is 4. The method then determines (at 575) a cost for each of the prediction modes 5, 4, and 6. The method then sets (at 580) the predictive mode with the lowest cost (among the prediction modes 5, 4, and 6) as the predictive mode for the current 4×4 array. The method then continues at step at 585.

In some embodiments, the method 500 selects predictive modes for 4×4 arrays of a macroblock where the predictive mode selection for each 4×4 array is dependent on previous predictive mode selections for one or more other 4×4 arrays in the macroblock. In these embodiments, the predictive mode selection for each of the 4×4 arrays of the macroblock depends on the encoded values (and thus the predictive mode selected) for its top and left neighboring 4×4 arrays. Therefore, in these embodiments, the method 500 selects predictive modes starting from the top left 4×4 array in the macroblock and proceeds to the right and then downwards. Given the predictive modes previously selected for the top and left neighboring 4×4 arrays, the method 500 then selects the predictive mode (among the 9 predictive modes) having the lowest cost for the current 4×4 array being processed. To do so, the method 500 may, for example, compute the total cost of the resulting combination (i.e., the sum cost of the sixteen determined costs).

A: Alternative Predictive Mode Search Algorithm

In an alternative embodiment, an alternative predictive mode search algorithm performs another set of operations. Initially, the alternative searching algorithm determines the index number of the prediction mode having the lowest cost among the set of predictive modes (0, 1, 3, and 4) where variable a is used to represent the determined index number. The alternative searching algorithm also determines the index number of the prediction mode having the second lowest cost among the set of predictive modes (0, 1, 3, and 4) where variable b is used to represent the determined index number.

Further, the alternative searching algorithm determines the index number of the prediction mode having the lowest cost among the set of predictive modes (0, 1, 2, 3, and 4) where variable n is used to represent the determined index number.

These operations can be expressed by the following equations:

a=GetIn1OfMinCost_a(0,1,3,4)

b=GetIn1OfSecondMinCost_b(0,1,3,4)

n=GetIn1OfMinCost(0,1,2,3,4)

where GetIn1OfSecondMinCost is a function that determines a cost for each prediction mode in a set of prediction modes (e.g., 0, 1, 3, and 4) and determines the index number of a prediction mode in the set having has the second lowest cost.

The searching algorithm then performs the following operations:

If n==2
   x=2
Else If (a, b)==(0, 4) or (4, 0)
   x==GetIn1OfMinCost(0, 5, 4)
Else If (a, b)==(4, 1) or (1, 4)
   x==GetIn1OfMinCost(4, 6, 1)
Else If (a, b)==(1, 3) or (3, 1)
   x==GetIn1OfMinCost(1, 8, 3)
Else If (a, b)==(3, 0) or (0, 3)
   x=GetIn1OfMinCost(3, 7, 0)
Else
   x=n where x is the index number of the prediction mode that is ultimately chosen as the optimal prediction mode (the select prediction mode) for the pixel array.

As such, the alternative searching algorithm determines if n is equal to 2. If so, the selected prediction mode is prediction mode 2. If n is not equal to 2, the alternative searching algorithm then determines if a is equal to 0 and b is equal to 4 or vice versa (i.e., if a is equal to 4 and b is equal to 0). If so, the selected prediction mode is the prediction mode having the lowest cost of the set of prediction modes (0, 5, 4).

If it is not true that a is equal to 0 and b is equal to 4 or vice versa, the alternative searching algorithm then determines if a is equal to 4 and b is equal to 1 or vice versa. If so, the selected prediction mode is the prediction mode having the lowest cost of the set of prediction modes (4, 6, 1).

If it is not true that a is equal to 4 and b is equal to 1 or vice versa, the alternative searching algorithm then determines if a is equal to 1 and b is equal to 3 or vice versa. If so, the selected prediction mode is the prediction mode having the lowest cost of the set of prediction modes (1, 8, 3).

If it is not true that a is equal to 1 and b is equal to 3 or vice versa, the alternative searching algorithm then determines if a is equal to 3 and b is equal to 0 or vice versa. If so, the selected prediction mode is the prediction mode having the lowest cost of the set of prediction modes (3, 7, 0).

Figure 6:
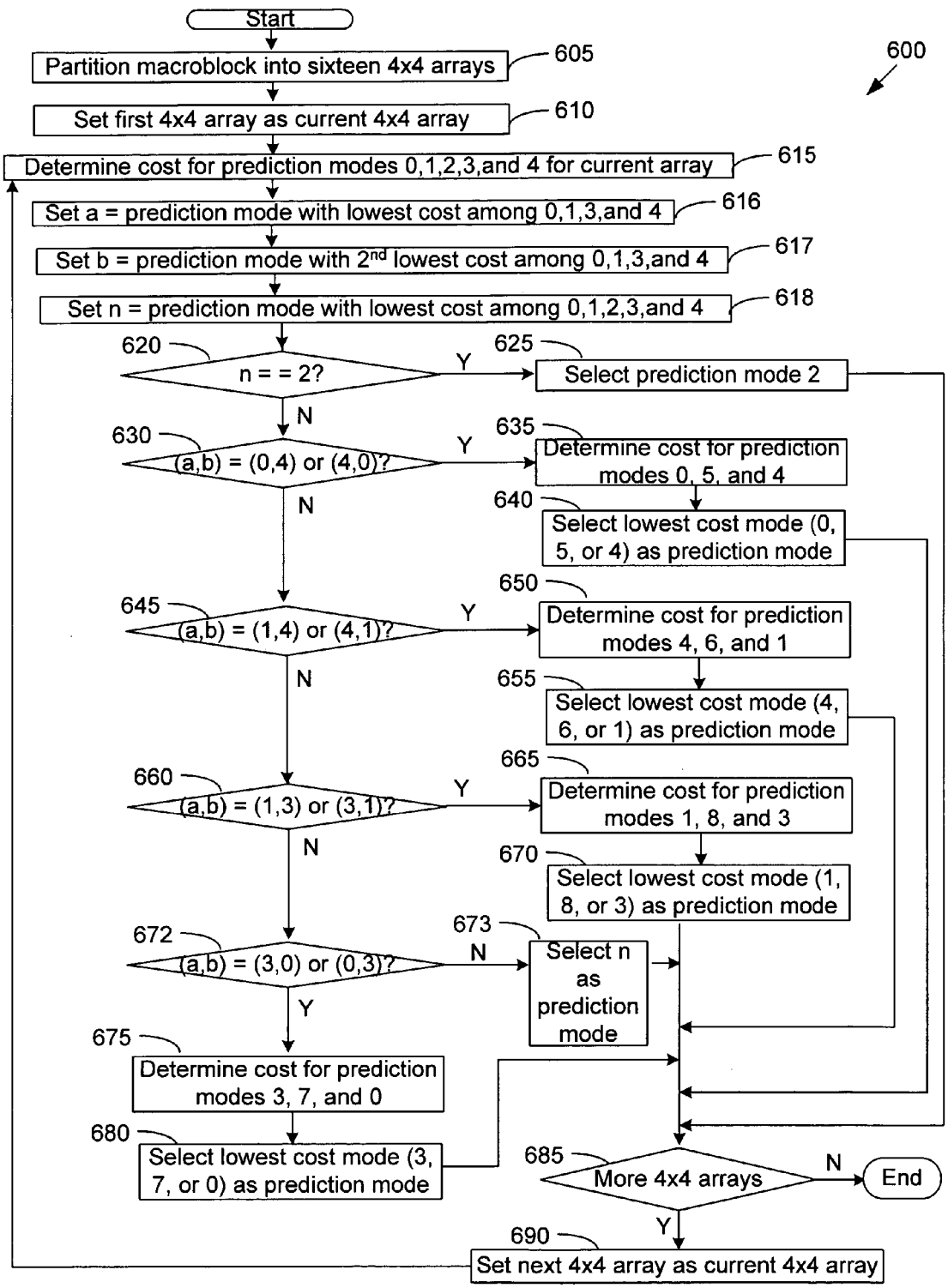
FIG. 6 is a flowchart of an alternative 4×4 predictive mode searching method that selects predictive modes for 4×4 arrays of a macroblock.

FIG. 6 is a flowchart of an alternative 4×4 predictive mode searching method 600 that selects predictive modes for 4×4 arrays of a macroblock. In some embodiments, the 4×4 alternative predictive mode searching method 600 comprises step 115 of FIG. 1.

The method 600 begins by partitioning (at 605) the macroblock into sixteen 4×4 arrays. The method then sets (at 610) a first 4×4 array as a current 4×4 array for processing. For the current 4×4 array, the method 600 then determines (at 615) a cost for each of the prediction modes 0, 1, 3, and 4. The method sets (at 616) variable a to equal the prediction mode index of the prediction mode having the lowest cost among prediction modes 0, 1, 3, and 4. The method sets (at 617) variable b to equal the prediction mode index of the prediction mode having the second lowest cost among prediction modes 0, 1, 3, and 4. The method also sets (at 618) variable n to equal the prediction mode index of the prediction mode having the lowest cost among prediction modes 0, 1, 2, 3, and 4

The method determines (at 620) if n is equal to 2. If so, the method sets (at 625) predictive mode 2 as the predictive mode for the current 4×4 array. The method then determines (at 685) if there are more 4×4 arrays in the macroblock to be processed. If so, the method sets (at 690) a next 4×4 array as the current 4×4 array and continues at step 615. If not, the method ends.

If the method determines (at 620—No) that n is not equal to 2, the method then determines (at 630) if the condition (a is equal to 0 and b is equal to 4 or vice versa) is true. If so, the method then determines (at 635) a cost for each of the prediction modes 0, 5, and 4. The method then sets (at 640) the predictive mode with the lowest cost (among the prediction modes 0, 5, and 4) as the predictive mode for the current 4×4 array. The method then continues at step 685.

If the method determines (at 630—No) that the condition (a is equal to 0 and b is equal to 4 or vice versa) is not true, the method then determines (at 645) if the condition (a is equal to 4 and b is equal to 1 or vice versa) is true. If so, the method then determines (at 650) a cost for each of the prediction modes 4, 6, and 1. The method then sets (at 655) the predictive mode with the lowest cost (among the prediction modes 4, 6, and 1) as the predictive mode for the current 4×4 array. The method then continues at step at 685.

If the method determines (at 645—No) that the condition (a is equal to 4 and b is equal to 1 or vice versa) is not true, the method then determines (at 660) if the condition (a is equal to 1 and b is equal to 3 or vice versa) is true. If so, the method then determines (at 665) a cost for each of the prediction modes 1, 8, and 3. The method then sets (at 670) the predictive mode with the lowest cost (among the prediction modes 1, 8, and 3) as the predictive mode for the current 4×4 array. The method then continues at step at 685.

If the method determines (at 660—No) that the condition (a is equal to 1 and b is equal to 3 or vice versa) is not true, the method then determines (at 672) whether the condition (a is equal to 3 and b is equal to 0 or vice versa) is true. If so, the method then determines (at 675) a cost for each of the prediction modes 3, 7, and 0. The method then sets (at 680) the predictive mode with the lowest cost (among the prediction modes 3, 7, and 0) as the predictive mode for the current 4×4 array. The method then continues at step 685. If the method determines (at 672—No) that the condition (a is equal to 3 and b is equal to 0 or vice versa) is not true, the method then sets (at 673) the predictive mode to equal the prediction mode indicated by the variable n (determined at step 618), i.e., the prediction mode having the lowest cost among prediction modes 0, 1, 2, 3, and 4. The method then continues at step 685.

Figure 7:
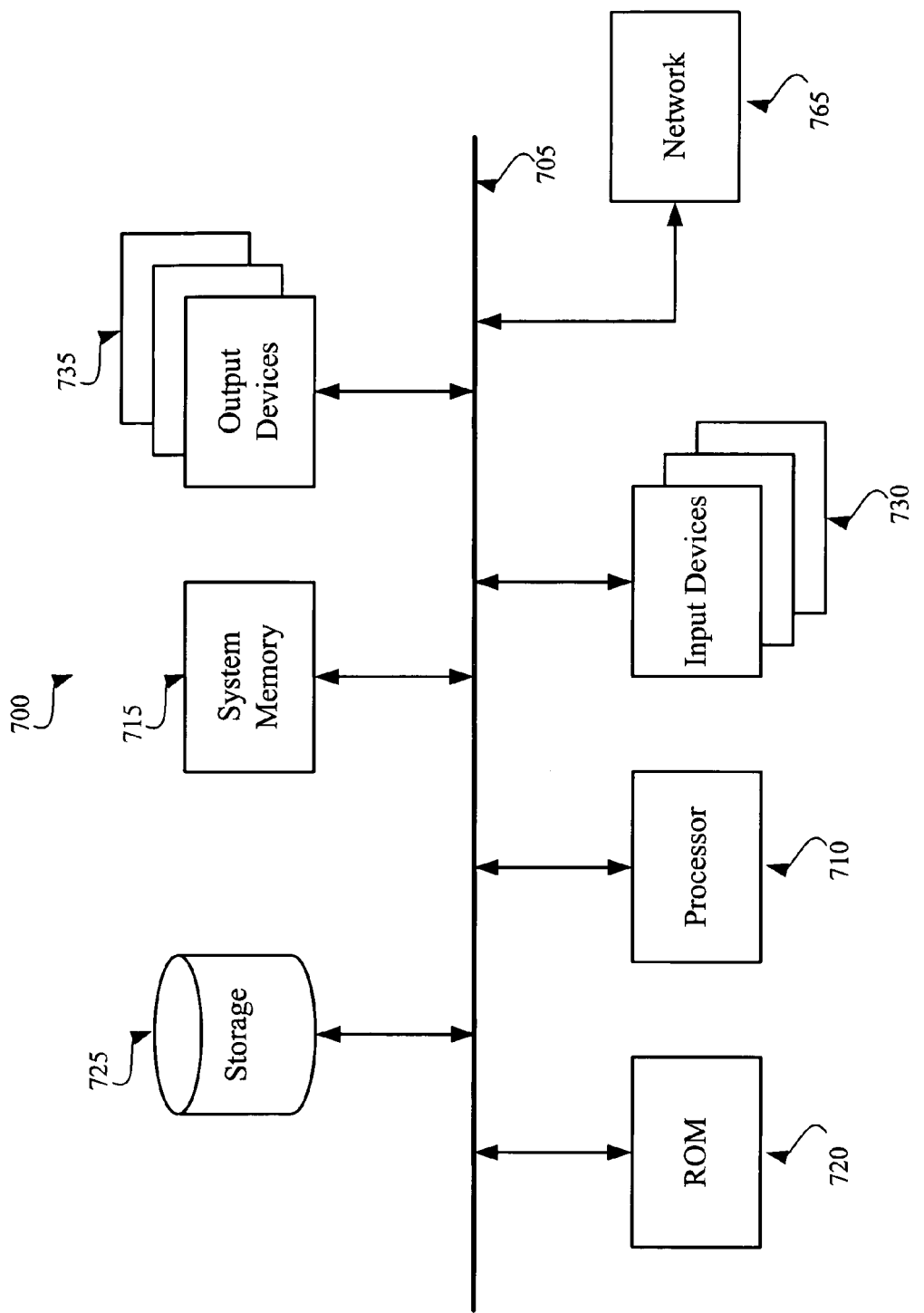
FIG. 7 presents a computer system with which some embodiments of the invention are implemented.

FIG. 7 presents a computer system 700 with which some embodiments are implemented. The computer system 700 includes a bus 705, a processor 710, a system memory 715, a read-only memory 720, a permanent storage device 725, input devices 730, and output devices 735.

The bus 705 collectively represents all system, peripheral, and chipset buses that communicatively connect the numerous internal devices of the computer system 700. For instance, the bus 705 communicatively connects the processor 710 with the read-only memory 720, the system memory 715, and the permanent storage device 725.

The read-only-memory (ROM) 720 stores static data and instructions that are needed by the processor 710 and other modules of the computer system. The permanent storage device 725, on the other hand, is read-and-write memory device. This device is a non-volatile memory unit that stores instruction and data even when the computer system 700 is off. Some embodiments use a mass-storage device (such as a magnetic or optical disk and its corresponding disk drive) as the permanent storage device 725. Other embodiments use a removable storage device (such as a floppy disk or Zip® disk, and its corresponding disk drive) as the permanent storage device.

Like the permanent storage device 725, the system memory 715 is a read-and-write memory device. However, unlike storage device 725, the system memory is a volatile read-and-write memory, such as a random access memory (RAM). The system memory stores some of the instructions and data that the processor needs at runtime.

Instructions and/or data needed to perform some embodiments are stored in the system memory 715, the permanent storage device 725, the read-only memory 720, or any combination of the three. For example, the various memory units may contain instructions for encoding or decoding video data streams in accordance with some embodiments and/or contain video data. From these various memory units, the processor 710 retrieves instructions to execute and data to process in order to execute the processes of some embodiments. From these various memory units, the processor 710 retrieves instructions to execute and data to process in order to execute the processes of some embodiments.

The bus 705 also connects to the input and output devices 730 and 735. The input devices 730 enable a user to communicate information and select commands to the computer system 700. The input devices 730 include alphanumeric keyboards and cursor-controllers. The output devices 735 display images generated by the computer system 700. The output devices include printers and display devices, such as cathode ray tubes (CRT) or liquid crystal displays (LCD).

Finally, as shown in FIG. 7, the bus 705 also couples the computer system 700 to a network 765 through, for example, a network adapter (not shown). In this manner, the computer system 700 can be a part of a network of computers (such as a local area network ("LAN"), a wide area network ("WAN"), or an Intranet) or a network of networks (such as the Internet). Any or all of the components of the computer system 700 may be used in conjunction with some embodiments. However, one of ordinary skill in the art would appreciate that any other system configuration may also be used in conjunction with other embodiments.

While the invention has been described with reference to numerous specific details, one of ordinary skill in the art will recognize that the invention can be embodied in other specific forms without departing from the spirit of the invention. For instance, many embodiments of the invention were described above by reference to macroblocks. One of ordinary skill will realize that these embodiments can be used in conjunction with any other array of pixel values.

We claim:

1. A non-transitory computer readable medium storing a computer program that is executable by one or more processing units, the computer program for intra predictive encoding a particular group of pixels of a video picture using a plurality of adjacent groups of pixels that are adjacent to the particular group of pixels in said video picture, the computer program comprising sets of instructions for:

identifying a first plurality of adjacent groups of pixels in said video picture, each adjacent group of pixels in the first plurality of adjacent groups of pixels having positional relationships with other adjacent groups of pixels in the first plurality of adjacent groups of pixels;

computing, for each adjacent group of pixels in the first plurality of adjacent groups of pixels, a first cost to intra predictive encode the particular group of pixels based on the adjacent group in said first plurality of adjacent groups of pixels;

identifying an adjacent group of pixels in the first plurality of adjacent groups of pixels based on said computed first costs for the first plurality of adjacent groups of pixels;

identifying a second plurality of adjacent groups of pixels in said video picture, the second plurality of adjacent groups of pixels comprising said identified adjacent group of pixels in the first plurality of adjacent groups of pixels, wherein adjacent groups of pixels in the second plurality of adjacent groups of pixels have stronger positional relationships with each other than the adjacent groups of pixels in the first plurality of adjacent groups of pixels have with each other such that the adjacent groups of pixels in the second plurality of adjacent groups of pixels are positioned closer to each other than the adjacent groups of pixels in the first plurality of adjacent groups of pixels;

computing, for each adjacent group of pixels in the second plurality of adjacent groups of pixels, a second cost to intra predictive encode the particular group of pixels based on the said second plurality of adjacent group of pixels;

identifying an adjacent group of pixels in the second plurality of adjacent groups of pixels based on said computed second costs for the second plurality of adjacent groups of pixels; and encoding the particular group of pixels by using the identified adjacent group of pixels in the second plurality of adjacent groups of pixels.

2. The non-transitory computer readable medium of claim 1, wherein the set of instructions for identifying the adjacent group of pixels in the first plurality of adjacent groups of pixels comprises a set of instructions for identifying an adjacent group of pixels having a lowest computed first cost in the first plurality of adjacent groups of pixels.

3. The non-transitory computer readable medium of claim 1, wherein the set of instructions for identifying the adjacent group of pixels in the second plurality of adjacent groups of pixels comprises a set of instructions for identifying an adjacent group of pixels having a lowest computed second cost in the second plurality of adjacent groups of pixels.

4. The non-transitory computer readable medium of claim 1, wherein the particular group of pixels is a partition of a macroblock.

5. The non-transitory computer readable medium of claim 1, wherein each adjacent group of pixels in the first plurality of adjacent groups of pixels has a logical relationship with all other adjacent groups of pixels in the first plurality of adjacent groups of pixels, wherein each adjacent group of pixels in the second plurality of adjacent groups of pixels has a closer logical relationship with said identified adjacent group of pixels in the first plurality of adjacent groups of pixels than each of the logical relationships between the adjacent groups of pixels in the first plurality of adjacent groups of pixels.

6. The non-transitory computer readable medium of claim 1, wherein the computed first and second costs are based on distortions due to the intra predictive encoding of the particular group of pixels.

7. The non-transitory computer readable medium of claim 1, wherein each group of pixels in the second plurality of adjacent groups of pixels has a stronger positional relationship with said identified adjacent group of pixels in the first plurality of adjacent groups of pixels than the positional relationships between the groups of pixels in the first plurality of adjacent groups of pixels.

8. The non-transitory computer readable medium of claim 1, wherein the plurality of adjacent groups of pixels corresponds to a plurality of intra predictive encoding modes.

9. The non-transitory computer readable medium of claim 8, wherein the plurality of intra predictive encoding modes comprises at least one of an intra 4×4 vertical prediction mode, an intra 4×4 horizontal prediction mode, an intra 4×4 DC prediction mode, an intra 4×4 diagonal down left prediction mode, an intra 4×4 diagonal down right prediction mode, an intra 4×4 vertical right prediction mode, an intra 4×4 horizontal down prediction mode, an intra 4×4 vertical left prediction mode, and an intra 4×4 horizontal up prediction mode.

10. The non-transitory computer readable medium of claim 1, wherein the computer program further comprises sets of instructions for:
   determining a cost of encoding the particular group of pixels using a DC intra predictive encoding mode; and
   selecting the DC intra predictive encoding mode to encode the particular group of pixels when the cost of intra predictive encoding the particular group of pixels using the DC intra predictive mode has a lower encoding cost than each of the computed first cost for each adjacent group of pixels in the first plurality of adjacent groups of pixels.

11. A method for intra predictive encoding a particular group of pixels of a video picture using a plurality of adjacent groups of pixels that are adjacent to the particular group of pixels in said video picture, the method comprising:
   identifying a first plurality of adjacent groups of pixels in said video picture, each adjacent group of pixels in the first plurality of adjacent groups of pixels having positional relationships with other adjacent groups of pixels in the first plurality of adjacent groups of pixels;
   for each adjacent group of pixels in the first plurality of adjacent groups of pixels, computing a first cost to intra predictive encode the particular group of pixels based on the adjacent group in said first plurality of adjacent groups of pixels;
   identifying an adjacent group of pixels in the first plurality of adjacent groups of pixels based on said computed first costs for the first plurality of adjacent groups of pixels;
   identifying a second plurality of adjacent groups of pixels in said video picture, the second plurality of adjacent groups of pixels comprising said identified adjacent group of pixels in the first plurality of adjacent groups of pixels, wherein adjacent groups of pixels in the second plurality of adjacent groups of pixels have stronger positional relationships with each other than the adjacent groups of pixels in the first plurality of adjacent groups of pixels have with each other such that the adjacent groups of pixels in the second plurality of adjacent groups of pixels are positioned closer to each other than the adjacent groups of pixels in the first plurality of adjacent groups of pixels;
   for each adjacent group of pixels in the second plurality of adjacent groups of pixels, computing a second cost to intra predictive encode the particular group of pixels based on the said second plurality of adjacent group of pixels;
   identifying an adjacent group of pixels in the second plurality of adjacent groups of pixels based on said computed second costs for the second plurality of adjacent groups of pixels; and
   encoding the particular group of pixels by using the identified adjacent group of pixels in the second plurality of adjacent groups of pixels.

12. The method of claim 11, wherein identifying the adjacent group of pixels in the first plurality of adjacent groups of pixels comprises identifying an adjacent group of pixels having a lowest computed first cost in the first plurality of adjacent groups of pixels.

13. The method of claim 11, wherein identifying the adjacent group of pixels in the second plurality of adjacent groups of pixels comprises identifying an adjacent group of pixels having a lowest computed second cost in the second plurality of adjacent groups of pixels.

14. The method of claim 11, wherein each adjacent group of pixels in the first plurality of adjacent groups of pixels has a logical relationship with all other adjacent groups of pixels in the first plurality of adjacent groups of pixels, wherein each adjacent group of pixels in the second plurality of adjacent groups of pixels has a closer logical relationship with said identified adjacent group of pixels in the first plurality of adjacent groups of pixels than each of the logical relationships between the adjacent groups of pixels in the first plurality of adjacent groups of pixels.

15. The method of claim 11, wherein the particular group of pixels is a partition of a macroblock.

16. The method of claim 11, wherein the computed first and second costs are based on distortions due to the intra predictive encoding of the particular group of pixels.

17. The method of claim 11, wherein each group of pixels in the second plurality of adjacent groups of pixels has a stronger positional relationship with said identified adjacent group of pixels in the first plurality of adjacent groups of pixels than the positional relationships between the groups of pixels in the first plurality of adjacent groups of pixels.

18. The method of claim 11, wherein the plurality of adjacent groups of pixels corresponds to a plurality of intra predictive encoding modes.

19. The method of claim 18, wherein the plurality of intra predictive encoding modes comprises at least one of an intra 4×4 vertical prediction mode, an intra 4×4 horizontal prediction mode, an intra 4×4 DC prediction mode, an intra 4×4 diagonal down left prediction mode, an intra 4×4 diagonal down right prediction mode, an intra 4×4 vertical right prediction mode, an intra 4×4 horizontal down prediction mode, an intra 4×4 vertical left prediction mode, and an intra 4×4 horizontal up prediction mode.

20. The method of claim 11 further comprising:
   determining a cost of encoding the particular group of pixels using a DC intra predictive encoding mode; and
   selecting the DC intra predictive encoding mode to encode the particular group of pixels when the cost of intra predictive encoding the particular group of pixels using the DC intra predictive mode has a lower encoding cost than each of the computed first cost for each adjacent group of pixels in the first plurality of adjacent groups of pixels.

* * * * *

UNITED STATES PATENT AND TRADEMARK OFFICE
CERTIFICATE OF CORRECTION

| | | |
|---|---|---|
| PATENT NO. | : 7,792,188 B2 | |
| APPLICATION NO. | : 11/070778 | |
| DATED | : September 7, 2010 | |
| INVENTOR(S) | : Xin Tong et al. | |

It is certified that error appears in the above-identified patent and that said Letters Patent is hereby corrected as shown below:

In column 14, line 7, delete "4" and insert -- 4. --, therefor.

Signed and Sealed this
Twenty-ninth Day of November, 2011

David J. Kappos
*Director of the United States Patent and Trademark Office*